L. C. Reese,
Harvester Rake.

No. 2259

Reissued May 29. 1866

Witnesses:
J. W. Coombs
R. S. Spencer

Inventor:
Lewis C. Reese
per Munn & Co
Attorneys

UNITED STATES PATENT OFFICE.

LEWIS C. REESE, OF PHILLIPSBURG, NEW JERSEY.

IMPROVEMENT IN HARVESTERS.

Specification forming part of Letters Patent No. 27,832, dated April 10, 1860; Reissue No. 2,259, dated May 29, 1866.

*To all whom it may concern:*

Be it known that I, LEWIS C. REESE, of Phillipsburg, in the county of Warren and State of New Jersey, have invented a new and useful Improvement in Grain and Grass Harvesters, of which the following is a full, clear, and exact description, reference being had to the accompanying drawings, which make part of this specification, and in which—

Figure 1:
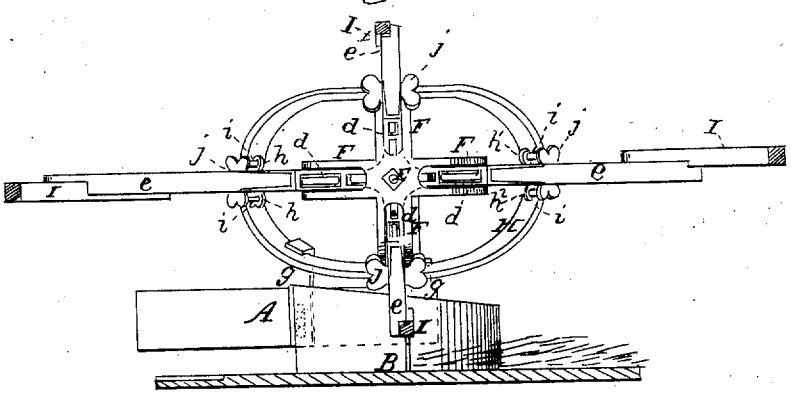
Figure 2:
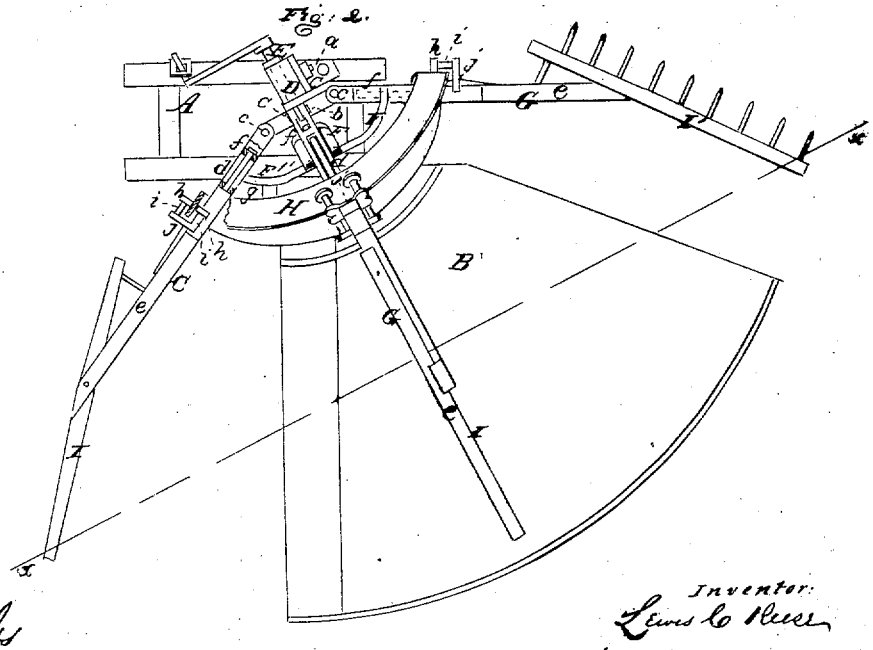

Figure 1 is a vertical section of my invention, taken in the line *x x*, Fig. 2, and Fig. 2 a plan or top view of the same.

My invention relates to that class of harvesting-machines in which a series of arms on a rotating shaft enter the standing grain in advance of the finger-beam, press the stalks back against the cutting apparatus, sweep the cut grain across the platform in a curved path, discharge it upon the ground, and then move forward again to repeat the operation, thus acting both as a rake and as a reel.

In machines of this class as constructed previously to the date of my invention the rake-arms projected nearly as far on the stubble as on the gearing side of the machine, and therefore a driver's seat could not well be placed upon the frame, nor could the machine be driven close to a tree, fence, or other obstruction without danger of striking the rake, nor could an attendant approach the machine on the stubble side while the rake was working without danger of being struck by it.

The objects of my invention are to enable the driver to ride safely upon the main frame, to cut the grain close to fences, trees, and other obstructions, and to allow the attendant to approach the machine without liability of being struck by the rake; and to these ends the improvement herein claimed consists, first, in combining with a series of revolving rising and falling rake and reel arms pivoted to a rotating shaft, from which they derive their motion, a guide which so regulates the motion of the arms that they descend into the standing grain in advance of the finger-beam, to press the grain back against the cutting apparatus, sweep across the platform and discharge the gavel at the rear end thereof, and then rise and move forward in an elevated position, out of the way of the falling grain, leaving an unobstructed space for the driver upon the machine; second, in a combined reel and rake so constructed that its arms shall have a revolving motion round their shaft and a rotary motion around their own axes, so as to cause the rake-teeth to point downward on their backward stroke to rake off the grain and to point upward on their forward stroke to be out of the way of obstructions which they might otherwise encounter; third, in combining a series of revolving rake and reel arms with a guide by means of an overlapping lip, projection, or stay attached to the rake-arm and traversing on the guide; fourth, in combining a rising and falling rake having the inner end of its arm hinged to a revolving shaft with a guide located between the rake and its pivot and so arranged as to cause the rake to descend into the uncut grain in advance of the finger-beam and press it back against the platform.

In the accompanying drawings, A represents a portion of the main frame of a harvester, and B a platform attached thereto.

C is an upright or standard slotted vertically and having a journal-box or bearing, D, attached to it by a screw-bolt, *a*, which passes through the slot in the upright C, as well as through the bearing, and admits of a vertical adjustment of the latter.

E is a shaft rotating freely in the bearing D, and having attached to one of its ends four radial arms, F, each arm being slotted longitudinally and curved toward the opposite end of the shaft E, as shown in Fig. 2.

Four arms, G, are attached by joints *c* to a hub or boss, *b*, on the shaft E. These arms are constructed in two parts, *e f*, connected by swivels *d*, to admit of the rotation of the outer parts, *e*, independently of their inner parts, *f*. The swivels are clearly shown in both figures, and constructed similarly to the ordinary swivels used for analogous purposes.

H represents a curved guide, which may be formed of a flat metal bar bent in elliptical form and forming a transverse section of a flattened cone, or the bar may be described as being bent in an elliptical and flaring form, its shape being clearly shown in the drawings. This guide is attached to the main frame A by supports *g g*.

The arms G are connected to the guide H by friction-rollers *h*, running on rods *i*, attached to plates *j*, secured to the outer or swiveling parts, *e*, of the rake-arms. There are four rods *i* to each plate *j*, two being on the outer and two on the inner side of the guide. Each arm consequently has four friction-rollers bearing on the guide.

A bar or rake-head, I I′, is attached obliquely to the end of each arm G, in one of which, I′, rake teeth are inserted.

The operation is as follows: The shaft E is rotated from any of the working parts of the machine, and as said shaft rotates the arms G are carried round on the guide H, and descend just in front of the sickle, and traverse back over the platform, the rake I′ raking the cut grain therefrom and the bars I performing the function of the beaters of a reel—viz., presenting the grain properly to the action of the cutters.

The arms G and their rake-heads successively rise at the back end of the platform (after having discharged the grain therefrom) and pass in an elevated position toward the front part of the machine, when they descend and again pass over the platform, the outer parts, *e*, of the arms G turning as they pass around on the guide H, owing to the swivels *d*, the bars turning down in a working position as they descend in front of the platform and turning up as they pass upward at the back of the platform.

The slotted arms F and joints *c* admit of the arms G, as they rotate, working in and out under the influence of the guide H, while the arms F keep the arms G in proper position relative to each other, or, in other words, relieve the joints *c* from lateral strains.

The lips or stays *i* cause the rake-arms to conform in all parts of their circuit to the guide H and to work smoothly while so doing.

The rake I′ and bars I may be made to work nearer to or farther from the platform by adjusting the bearing D in the vertical slot in the standard C.

By this mode of operation it will be seen that little if any part of the rake projects beyond the stubble side of the machine, and that an ample unobstructed space is left on the front of the main frame, on which the driver may be placed without danger of being struck by the rake-arms, or without their even passing over his head. The machine can thus be driven closer to fences, trees, &c., than if the arms projected on the stubble side, and the attendant can approach that side without danger from the rake.

What I claim as my invention is—

1. The combination, with a series of revolving rising and falling rake and reel arms pivoted to a rotating shaft from which they derive their motion, of a guide which so controls the motion of the rake-arms as to cause them to descend into the standing grain in advance of the finger-beam, to press the grain back against the cutting apparatus, to sweep across the platform and discharge the gavel at the rear end thereof, and then to rise and move forward in an elevated position out of the way of the falling grain without projecting beyond the stubble side of the machine, and leave an unobstructed space on the machine, upon which the driver may ride.

2. A combined reel and rake, with its arms so constructed that they shall have a revolving motion around their shaft and a rotating motion around their own axes, for the purpose of turning their teeth downward when raking off and upward when moving forward.

3. The combination of the rake-arms with the guide by means of the overlapping projections, stays, or rods *i*, substantially in the manner described, for the purpose of holding the rake to the guide during its entire circuit.

4. The combination of a revolving rake having its arm hinged to its shaft at the inner end with a guide located between the rake-head and its pivot, whereby I cause the rake to descend into the uncut grain in advance of the finger-beam, to press the stalks back against the cutting apparatus, to sweep across the platform in a horizontal circular path and discharge the gavel, and then to rise and move forward in an elevated position, out of the way of the falling grain, without projecting beyond the main frame or passing over the head of the driver.

In testimony whereof I have hereunto subscribed my name.

LEWIS C. REESE.

Witnesses:
A. S. HULSIZER,
H. SNYDER.